(12) United States Patent
Hines et al.

(10) Patent No.: US 6,570,585 B1
(45) Date of Patent: May 27, 2003

(54) SYSTEMS AND METHODS FOR PREPARING AND TRANSMITTING DIGITAL MOTION VIDEO

(76) Inventors: David E. Hines, 121 Deansgate, Manchester, M3 2BX (GB); Michael D. Wachner, 9322 Capobella, Aliso Viejo, CA (US) 92653; W. Lance Ware, 24986 La Pontera, Laguna Niguel, CA (US) 92677

(*) Notice: Subject to any disclaimer, the term of this patent is extended or adjusted under 35 U.S.C. 154(b) by 0 days.

(21) Appl. No.: 09/430,728

(22) Filed: Oct. 29, 1999

Related U.S. Application Data

(60) Provisional application No. 60/106,522, filed on Oct. 31, 1998.

(51) Int. Cl.[7] .............................................. G06F 13/14
(52) U.S. Cl. ...................... 345/716; 345/473; 345/723; 345/760; 345/719
(58) Field of Search ................................ 345/473, 723, 345/724, 725, 716, 760, 749, 719; 709/203, 219; 707/513

(56) References Cited

U.S. PATENT DOCUMENTS

| | | | | |
|---|---|---|---|---|
| 5,802,294 A | * | 9/1998 | Ludwig et al. | 709/204 |
| 5,867,654 A | * | 2/1999 | Ludwig et al. | 709/204 |
| 6,226,392 B1 | * | 5/2001 | Bacus et al. | 356/39 |

* cited by examiner

Primary Examiner—Kristine Kincaid
Assistant Examiner—Thomas T. Nguyen
(74) Attorney, Agent, or Firm—Snell&Wilmer LLP

(57) ABSTRACT

A plurality of video image components are prepared and transmitted over a network, whereupon the components are assembled into a composite digital video image. The video image components comprise at least one motion video component and at least one still video component. The video image components further comprise at least one animated video component. In this way, multiple video image components may be efficiently transmitted and assembled to give the appearance of a single, high-quality video image.

3 Claims, 8 Drawing Sheets

SYSTEMS AND METHODS FOR PREPARING AND TRANSMITTING DIGITAL MOTION VIDEO

CROSS-REFERENCE TO RELATED APPLICATIONS

This application claims the benefit of U.S. Provisional Application Serial Number 60/106,522 filed Oct. 31, 1998 hereby incorporated by reference.

FEDERALLY SPONSORED RESEARCH OR DEVELOPMENT

Not applicable.

BACKGROUND OF THE INVENTION

1. Technical Field

The present invention relates, generally, to digital motion video and, more particularly, to improved methods for preparing, transmitting, and reconstructing a composite digital video image comprising motion video, animated video, and still video components.

2. Background Information

The popularity of the Internet is due in large part to the wide availability of graphical and multimedia information available over the World Wide Web (WWW). That is, it has become quite common for WWW sites to incorporate streaming video and other motion video formats into web pages. Unfortunately, this practice often results in unendurable download times. Despite recent advances in digital video compression techniques and the development of higher data rate modems (e.g., V.90, cable modems, etc.), the transmission of video files remains problematic.

In an effort to reduce bandwidth requirements, video images are often either cropped to an unsatisfactory size (e.g., "thumbnail" size) or implemented using an extremely low frame rate. This is the case even in applications where much of the displayed video includes background information.

Methods are therefore needed in order to overcome these and other limitations of the prior art. Specifically, systems and methods are needed for providing large, high-resolution motion video images over a network in a manner which conserves available bandwidth.

BRIEF SUMMARY OF THE INVENTION

The present invention provides systems and methods which overcome the shortcomings of the prior art. In accordance with one aspect of the present invention, a plurality of video image components are prepared and transmitted over a network, whereupon the components are assembled into a composite digital video image. In accordance with a preferred embodiment of the present invention, the video image components comprise at least one motion video component and at least one still video component. In accordance with a further aspect of the present invention, the video image components further comprise at least one animated video component. In this way, multiple video image components may be efficiently transmitted and assembled to give the appearance of a single, high-quality video image.

BRIEF DESCRIPTION OF THE SEVERAL VIEWS OF THE DRAWINGS

The subject invention will hereinafter be described in conjunction with the appended drawing figures, wherein like numerals denote like elements, and.

DETAILED DESCRIPTION OF PREFERRED EXEMPLARY EMBODIMENTS

In accordance with various aspects of the present invention, a plurality of video image components (e.g., still video components, motion video components, and animated video components) are prepared and efficiently transmitted over a network, whereupon the components are assembled into a composite digital video image. In this regard, the present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and systems (for example, the architectural details of hosts, personal computers, servers and the like as connected to the Internet) which are known to those skilled in the art, are not described in detail herein. In addition, those skilled in the art will appreciate that the present invention—while illustrated in the context of the existing Internet—may be practiced in any number of data communication contexts. The various systems described herein are merely exemplary applications for various aspects of the invention.

Figure 1:
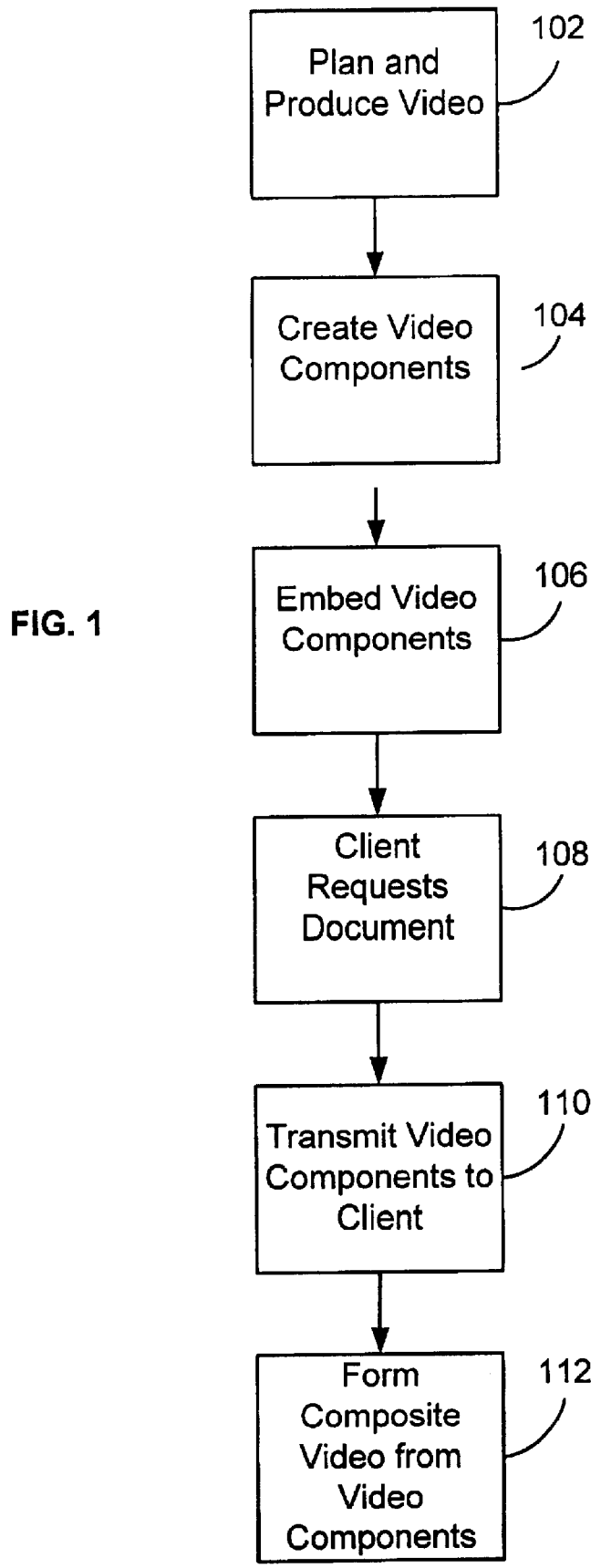
FIG. 1 is a flowchart showing an overview of a method in accordance with the present invention.

Referring now to FIG. 1, a general overview of the present invention will now be described. It should be understood that the various software packages cited herein are merely exemplary, and that any number of suitable existing or future software packages may be appropriate for a given task. Moreover, any of the exemplary processes may comprise more or less steps or may be performed in the context of a larger processing scheme. The various flowcharts presented in the drawing figures are not to be construed as limiting the order in which the individual process steps may be performed.

Specific information related to the protocols, standards, and application software utilized by in connection with the Internet will not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997). Loshin, TCP/IP Clearly Explained (1997). All of these texts are hereby incorporated by reference.

Moreover, the term "web page" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

In general, in Step 102, the original live action motion video is planned and produced. This step may encompasses a wide variety of activities aimed at producing a full motion video amenable to subsequent processing steps. For example, Step 102 preferably includes scene design (identification of moving video elements, identification of animated elements, determination of motion interfaces, etc.), set design and lighting, scene motion analysis, talent direction, video recording (e.g., analog or digital recording), video post-production, audio post-production, dubbing to an appropriate format, and digital processing. The goal of this step is to optimize the original motion video for the purposes of exploiting the techniques described below.

Figure 2A:
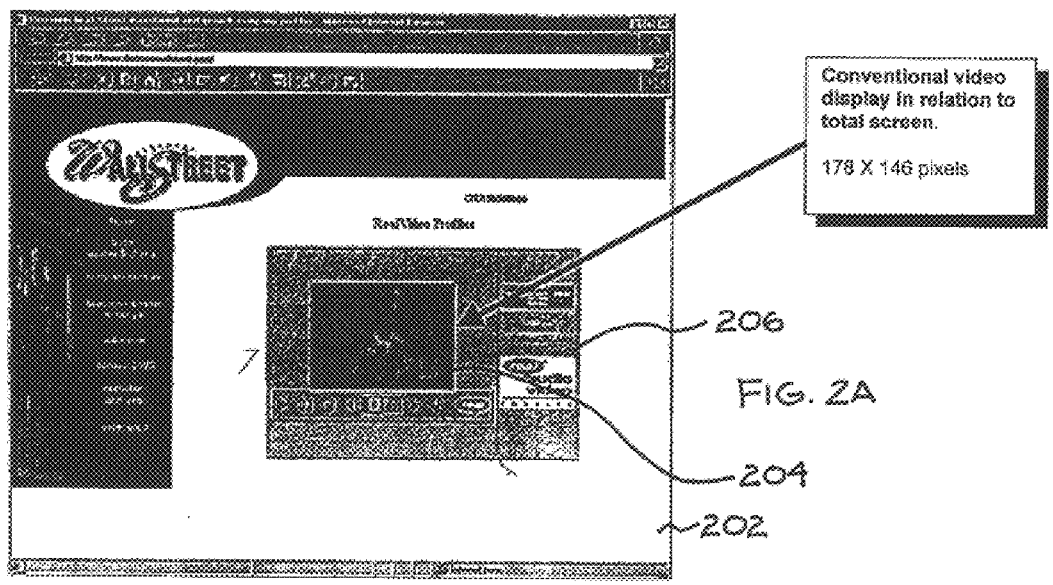
FIG. 2A depicts a conventional video display in relation to total screen area.
Figure 2B:
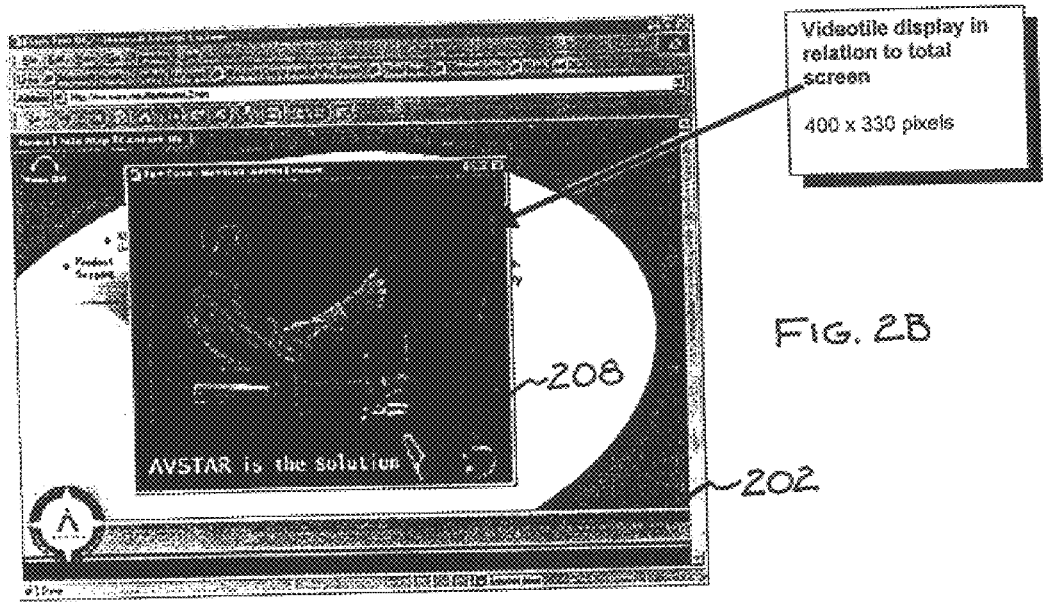
FIG. 2B depicts a video display in accordance with various aspects of the present invention.

In general, referring briefly to FIGS. 2A and 2B, methods in accordance with the present invention (FIG. 2B) allow for a relatively large display area 208 (for example, 400×300 pixels) in relation to the entire browser window 202 as compared to conventional digital video display 204(e.g., 178×146) running within standard video playback software (206). Thus, bandwidth is preserved and/or playback speed is increased.

Figure 3:
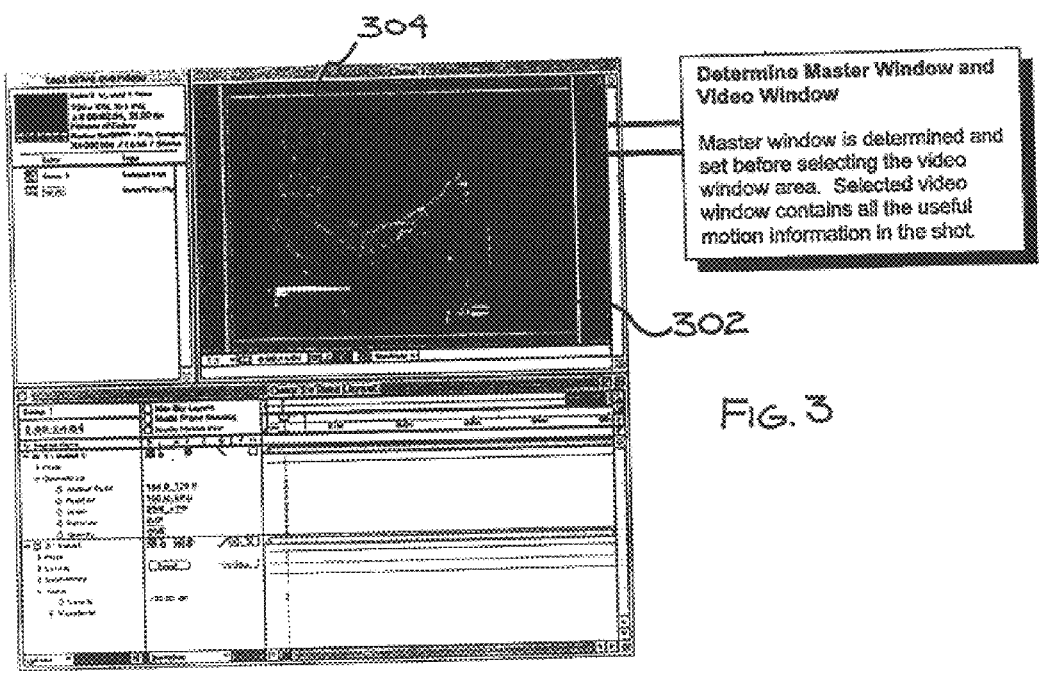
FIG. 3 depicts the definition of a master window and a video window.
Figure 4:
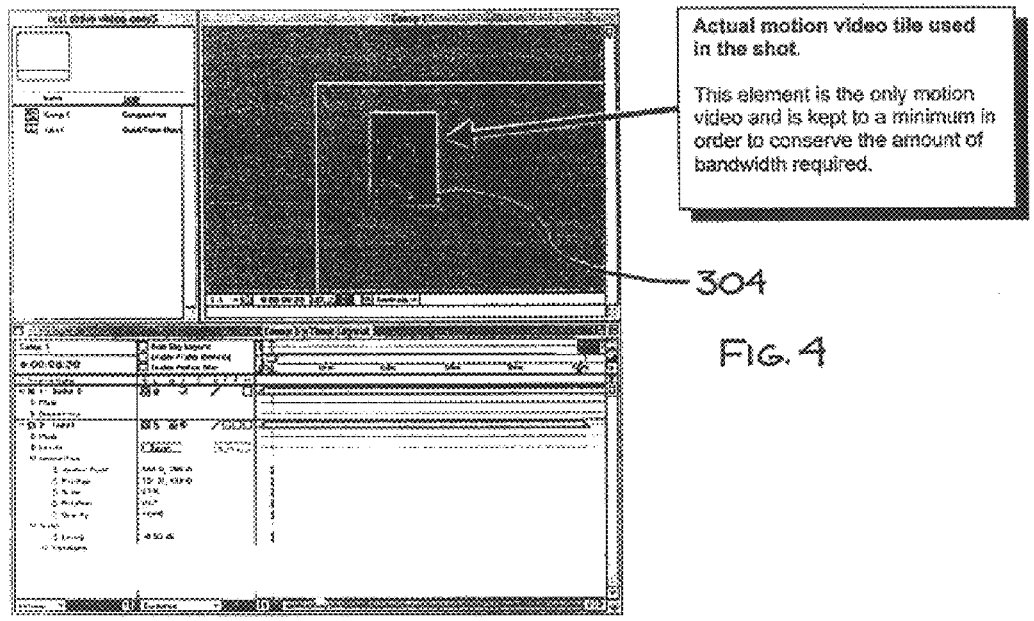
FIG. 4 depicts the resultant video tile corresponding to image definitions performed in accordance with FIG. 3.
Figure 5:
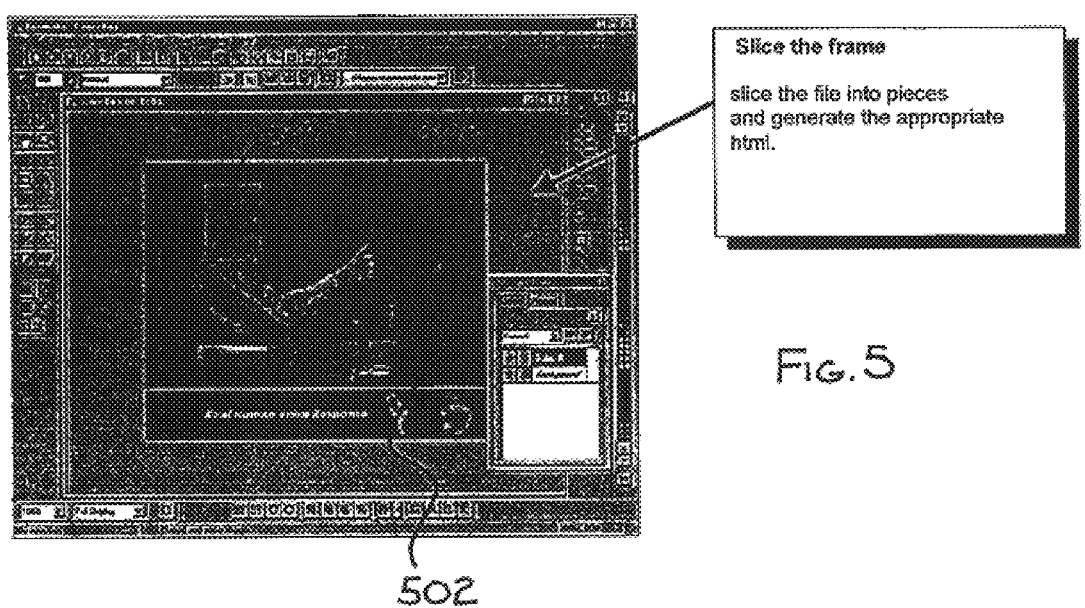
FIG. 5 depicts a composite image in accordance with the present invention.

Referring to FIGS. 1, 3 and 4, in Step 104, the individual video components are created. That is, suitable software packages are used to determine a master window 302, capture a still video image (or "still video component"), define and create a motion video component 304, and, if appropriate, define and create one or more animated video components. The motion video component 304 comprises the full motion video portion of the complete video, and is preferably minimized (e.g., about 10% to 25% of the master window size) to reduce the bandwidth necessary for its transmission. The still video image 302 refers to the "background" image or still frame. The animated video components (not shown) are those components comprising a number of frames within a defined area (or "tile") which are strategically chosen to add supplemental motion over a larger area. The animated video may include raster based and/or vector based graphics. A variety of digital video formats are appropriate for this purpose (e.g., AVI, Quicktime, and the like). For example, animated video regions might include a few frames suggesting the movement of trees or background objects. The resulting components may then be sliced into suitable "pieces" for later assembly via appropriate HTML code.

In the exemplary embodiment, in Step 106, the various video components (i.e., the individual video files) are embedded within a document accessible over a network. In a preferred embodiment, this step is performed by using appropriate HTML tags, for example, <OBJECT> and <EMBED> tags, to embed the video files within an HTML document available over the WWW. These and other HTML tags are well known in the art.

In Step 108, after the video components have been embedded in the document and provided, on a server for access over a network, a client located within the network requests the document. In the HTML paradigm, this step involves a request by the client WWW browser software (e.g., Netscape Communicator, Microsoft Explorer, and the like).

In response to a client request, the HTML document and the embedded video components are transmitted to the client's system (Step 110). In this regard, it will be appreciated that the HTML document or documents and any associated video components may reside on a single server or may be distributed among any number of servers. In this regard, client systems may include any convenient combination of hardware and software components configured to communicate over the Internet. For example, a typical client system might include a standard personal computer (PC) comprising a CPU, monitor, storage, keyboard, mouse, and communication hardware appropriate for the given data link (e.g., V.90 modem, network card, cable modem, etc.).

Furthermore, as the present invention is best deployed in the context of a large user-base, the network accessed by the client system preferably corresponds to the Internet. As used herein, the term "Internet" refers to the global, packet-switched network utilizing the TCP/IP suite of protocols. Nevertheless, the present invention may be implemented in other network contexts, including any future alternatives to the Internet, as well as other suitable "internetworks" based on other open or proprietary protocols. As is known in the art, the Internet consists of a network of networks including a large number of hosts. In accordance with a preferred embodiment of the present invention, the various video components reside on the host, and are subsequently served to the client systems over the Internet via HTTP.

In Step 112, the individual video components are assembled into a composite motion video image. In a preferred embodiment, this step is accomplished by the client side browser in a manner consistent with the embedded HTML tags described above in connection with Step 106.

Figure 6A:
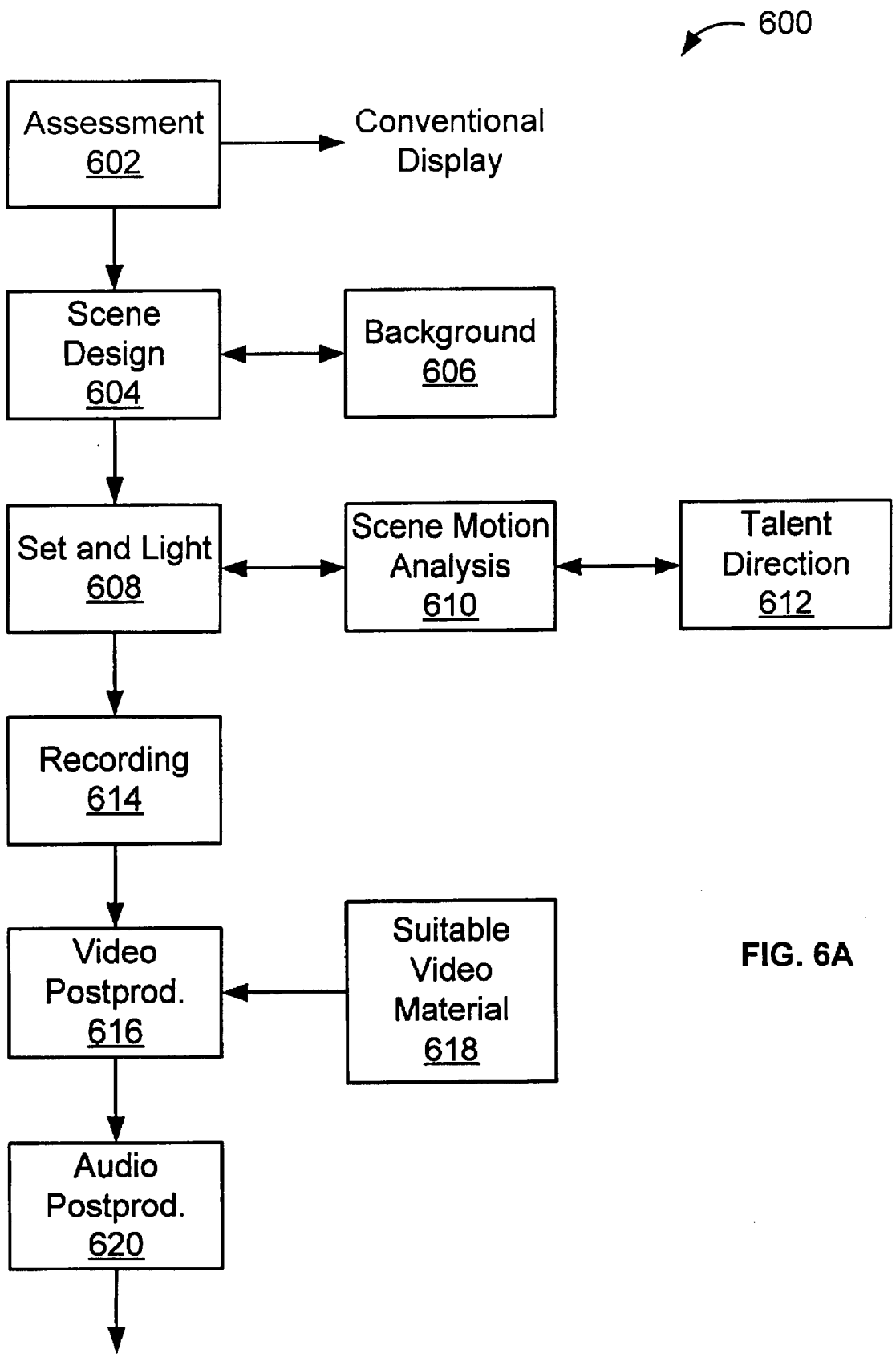
FIG. 6A is a flow chart in accordance with various aspects of the present invention.
Figure 6B:
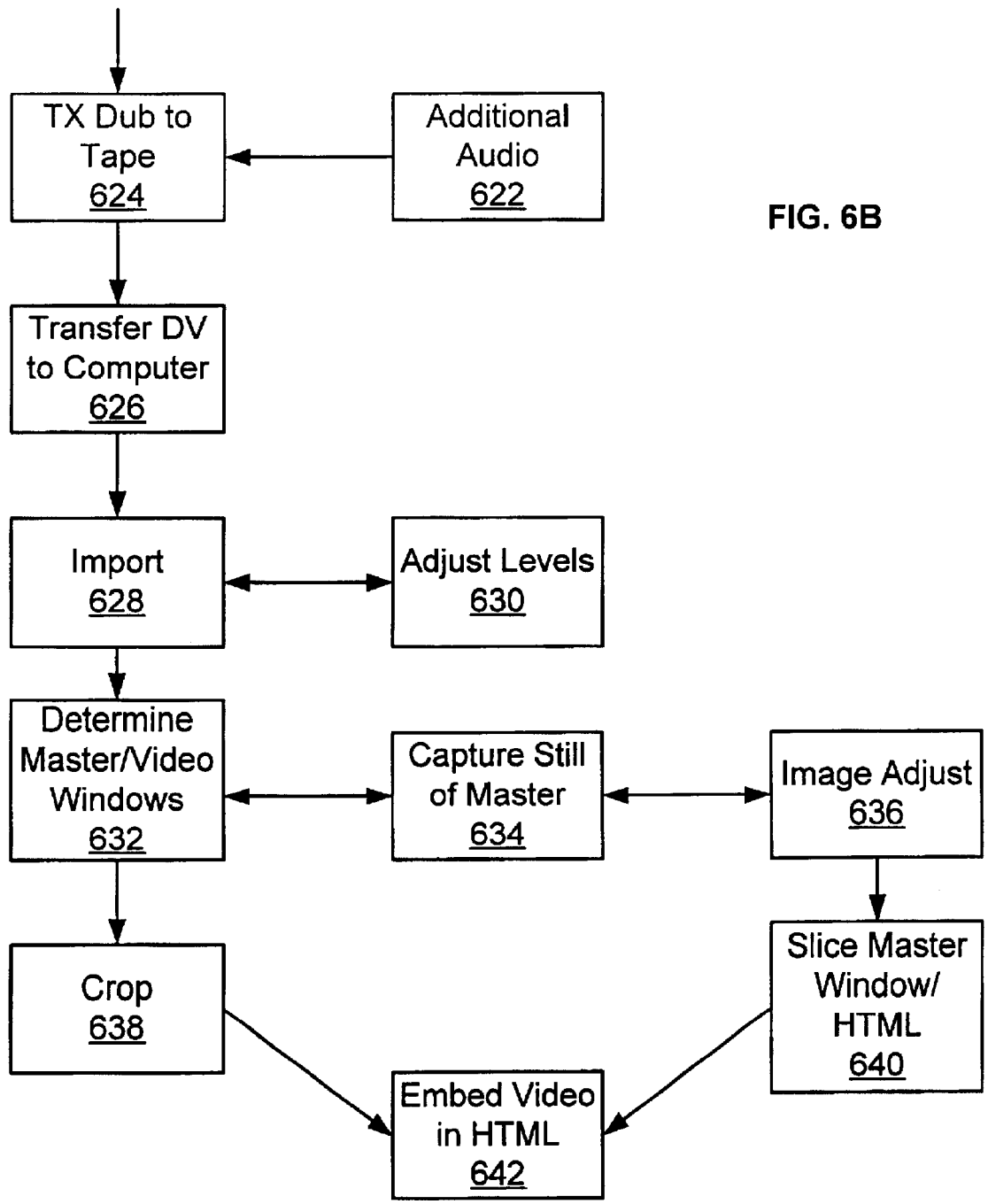
FIG. 6B is a continuation of the flow chart shown in FIG. 6A.

Referring now to FIGS. 6A and 6B, a detailed description of an exemplary method in accordance with the present invention will now be set forth.

First, in step 602, an assessment is made of the suitability of using methods in accordance with the present invention for the task at hand. For example, the present invention is advantageously employed for scenes and video in which a relatively small area of the total image size requires full motion video (i.e., where much of the background is static and/or may be portrayed through small animations). The objective is to create the illusion that the scene being presented is in fact a large full motion video image. Thus, "talking head" shots, interviews, camera presentations, and simple communications are particularly advantageous applications.

Next, in step 606, the scene is designed (i.e., motion elements and interfaces are identified), and the background is designed (Step 606). The scene may employ color separation overlay (CSO) to achieve the background. In such case, care should be taken to produce a key with a minimum of noise at the interface (of tiles) in order to reduce the bandwidth required by the scene. As mentioned above, the typical area of the motion tile is preferably about 10%–25% of the final screen area. Other ratios of motion to still image may also be used. Candidate animation images are also identified, if appropriate.

In Step 608, the set and light are determined, paying particular attention to details that will affect the overall quality of the resultant video. In this regard, the following guidelines may be applied: In general, higher contrast can be tolerated and is preferable as the majority of the scene is typically a still image. Saturation can be more subtle, particularly with respect to flesh-tones. Major advantages in color appearance can be achieved by recording in PAL as opposed to NTSC, although other formats may also be employed. Black level may be slightly crushed to aid the process of invisible tiling in black-edged areas. Furthermore, it is preferably not to over-expose any area, particularly on the face and hands, as this is accentuated as the picture is further processed. A high level of detail can be handled by the process and every effort should be made to light for detail and use high quality optics and available video enhancement features.

A scene motion analysis is preferably performed (Step 610), taking into consideration such indicia as distance, size, and speed of the moving objects or objects. In addition, the talent (e.g., actor, puppets, animals, and the like) are directed to optimize the resultant video (612). That is, the on-camera talent must be made aware of the need to control the amount and speed of movements. In particular, the positioning of the talent and the restriction of movement in the areas of intersection need special attention. Where possible, props are preferably used to restrict movement (e.g., a close fitting chair, arm rests, etc.). Clothing should avoid vertical lines. Body position can minimize these issues. Fore example, a semi-profile body-shot with head turned to the camera can reduce the alignment problems.

After scene and set design is performed, a recording is made using suitable recording equipment media—for example, video tape or direct digital video recording (step 614). Scenes are preferably recorded in one shot without the need for editing. Should editing be necessary to reduce length, etc., it is best that no background change occurs—although it is possible to do so if CSO is employed.

The camera is preferably rigidly mounted on a high-quality stand to prevent significant movement or vibration during an part of the recording. Attention to eye line in relation to the proposed CSO background angle, if used is important to achieve a convincing result. Focal length should be considered in light of the proposed CSO background focal length, and a fixed aperture setting should be employed to stabilize the depth-of-field. Similarly, a fixed focal point, rather that autofocus, is preferably used.

With respect to video tape, although the video stream will typically be compressed significantly during the process, the highest available recording format should be employed to minimize the noise in the picture and to guarantee a high quality still image. It is also advisable to retain a high-quality master as a backup to the process.

Recording directly to a computer hard-drive is possible if a DVCAM camera is used which employs a "FireWire" connection. DVCAM PAL may be used to overcome to a large extent any system quality issues arising from this configuration. Audio recording is preferably made in accordance with conventional broadcasting specifications, preferably in a mono format.

A The scene should be carefully monitored during recording. For example, the chosen areas of motion should be clearly marked on the monitor, and the talent should be directed to maintain motion within these set parameters.

Video post-production (Step 616) is preferably performed to provide keying, video effects, etc., and to incorporate video material from other sources if appropriate (Step 618). The editing process is best carried out in the digital domain to reduce the probability of noise being introduced into the picture. All editing should be substantially invisible, and where any slight mismatch of the adjacent frames of moving elements occurs, a dissolve—for example, a five-frame dissolve—should be used.

Audio post-production (Step 620) is preferably performed. The general quality and optimum range of the reproduction speakers available to the target audience for the scene will determine the frequency range of the final audio track. Substantial audio compression will typically be employed in the final processing, tending to reduce the lower frequencies. Additional audio components (622) may also be added.

Next, in step 624, a TX dub of video is made to DVCAM format. In one embodiment, master tapes are TX dubbed using digital Beta SP PAL to DVCAM PAL ready for digital processing.

Those skilled in the art will recognize that this step may or may not be performed depending upon the actual formats being used. That is, this dubbing step may not be required in other contexts.

The DV files are then transferred to a suitable computer format (Step 626), for example, using a DV format tape and a FireWire connection. The capturing of necessary footage may be accomplished using a variety of hardware and software components, for example, a Radius MotoDV capture system. In such a system, the footage is not being resampled or re-digitized, the FireWire simply transfers the files from tape to hard drive. Files are saved in a QuickTime "Radius SoftDV" format.

The resulting file or files are then imported into suitable video manipulation software package (e.g., Adobe After Effects), where color levels, darkness, contrast, and the like are adjusted (Steps 628 and 630). The composition settings preferably match the clip resolution and frame rate. Final resolution of the finished piece is determined, and the composition settings are adjusted to match. The image is then adjusted to fit the frame appropriately.

As described above, the master window and video motion windows are determined (Step 632), a still frame is captured from the master window (Step 634), and various image adjustments are applied as appropriate (Step 636). In accordance with one embodiment employing Adobe After-effects, a new layer is first created which is colored white, 30% opaque, and placed on top of the video clip layer. This layer can be used as the target window for the video clip. The size of the window is then reduced as small as possible without clipping any "motion". This window should be substantially the same as the area designated at planning and recording. Once the window size and position are set, the composition settings are adjusted to match exactly the area of the shaded "motion" window by setting the composition area resolution and repositioning the video clip appropriately.

A movie is then created, for example, as a QuickTime uncompressed file. After the file has been created it, it is converted to an appropriate format, for example, an .avi file with settings based on bandwidth availability/requirements.

The video file is then reopened to find a frame to use as the master frame. The time code of this frame is recorded, and the frame is captured, for example, by exporting the clip as a PhotoShop file feature in After Effects. This will produce the master frame with the video window opaque box on a separate layer. Any corrections to the captured frame are then made as necessary.

The adjusted image is sliced, and appropriate HTML code is generated (Step 640). The video window is cropped and rendered, and a event sync is added to the motion video file (Step 638).

For example, in order for the RealVideo files to be in sync with the flash animations, the RealVideo streams must include event URL markers embedded into the video. Such techniques are known in the art.

The resulting image is then embedded into an HTML document for viewing by the client system (Step 642). In one embodiment, an HTML file with both <OBJECT> and <EMBED> tags are used in order to work with both Microsoft IE and Netscape. The following lines of HTML show just one way of accomplishing this task using a standard HTML table with three rows, wherein the second row includes the motion video component:

```
<table border="0" cellpadding="0" cellspacing="0" width="470">
<tr>
    <td rowspan="1" colspan="3"><img name="Nnowindows_01_01"
    src="images/nowindows_00.gif" width="1" height="29" border="
    0"></td>
</tr>
<tr>
    <td rowspan="2" colspan="1"><img name="Nnowindows_02_01"
    src="images/nowindows_02_01.gif" width="80" height=
    "80" height="292" border="0"></td>
    <td rowspan="1" colspan="1"><OBJECT ID=VID1 CLASSID="
    clsid:CFCDAA03-8BE4-11cf-B84B-0020AFBBCCFA" WIDTH=80
    HEIGHT=112>
<PARAM NAME="SRC" VALUE="
http://ivs.ware.net:8080/test/testdrive/video.rpm">
<PARAM NAME="CONTROLS" VALUE="VideoWindow">
<PARAM NAME="CONSOLE" VALUE="Video1">
<PARAM NAME="AutoStart"VALUE="true">
<EMBED SRC="http://ivs.ware.net:8080/test/testdrive/
video.rpm"WIDTH=80 HEIGHT=112 CONTROLS="VideoWindow"
console="video1" autostart="true"></OBJECT><td>
    <td rowspan="2" colspan="1"><img name="Nnowindows_02_03"
    src="images/nowindows_02_03" src="images/
    nowindows_02_03.gif" width="310" height="292" border=
    "0"></td>
    <td><img src="images/nowindows_00.gif" width="1" height="112"
    border="0"></td>
</tr>
<tr>
    <td rowspan="1" colspan="1"><img name="Nnowindows_03_02"
    src="images/nowindows_03_02.gif" width="80" height="180"
    border="0"></td>
    <td><img src="images/nowindows_00.gif" width=
    "1" height="180" border="0"></td>
</tr>
</table>
```

As will be understood by those skilled in the art, in the above HTML table, the video source uniform resource locator (URL) is given as:

http://ivs.ware.net: 8080/test/testdrive/video.rpm.

It will be appreciated that other file formats and directory structures may be used.

It will be appreciated that the software packages discussed above do not in any way limit the present invention. Other current and future video streaming technologies may be used. Other software components such as Microsoft Net-Show and Apple's Quicktime (e.g., versions 3.0 and higher) may be employed.

Furthermore, while the above description has been predicated on an existing, predetermined set of video and still image components residing on a host system, the present invention may also be used in a "live" environment, given suitable constraints on the talent and appropriate software.

Although the invention is described herein in conjunction with the appended drawings, those skilled in the art will appreciate that the scope of the invention is not so limited. Modifications in the selection, design, delivery, and arrangement of the various components and steps discussed herein may be made without departing from the scope of appended claims.

We claim:

1. A method of transmitting video images for viewing over a packet-switched network, comprising:

providing, on a host system, a plurality of video image components, said video components comprising at least one motion video component, at least one animated video component, and at least one still video component;

wherein said motion video component, said animated video component and said still video component are components of a single scene;

transmitting said plurality of video image components to a client system;

assembling said plurality of video image components into a composite motion video image representing said single scene by using a plurality of HTML tags provided within an HTML document sent to said client system;

displaying, within a single window, said composite motion video image on said client system;

wherein said displaying step includes the step of displaying said composite motion video image within a browser window as said single scene.

2. The method of claim 1, wherein said transmitting step comprises the step of transmitting said plurality of video images using an HTTP protocol.

3. The method of claim 1, wherein said motion video component conforms to a file format selected from the group consisting of MPEG, AVI, and Quicktime.

* * * * *